US009992441B2

(12) United States Patent
Butcher et al.

(10) Patent No.: US 9,992,441 B2
(45) Date of Patent: Jun. 5, 2018

(54) DISPLAYING MULTIPLE VIDEOS ON SINK DEVICE USING DISPLAY INFORMATION OF SOURCE DEVICE

(71) Applicant: Lattice Semiconductor Corporation, Portland, OR (US)

(72) Inventors: Lawrence Llewelyn Butcher, Mountain View, CA (US); William Mulcahy, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 188 days.

(21) Appl. No.: 14/589,889

(22) Filed: Jan. 5, 2015

(65) Prior Publication Data

US 2016/0198117 A1    Jul. 7, 2016

(51) Int. Cl.
| | |
|---|---|
| *H04N 5/445* | (2011.01) |
| *G09G 5/00* | (2006.01) |
| *H04N 21/40* | (2011.01) |
| *H04N 7/08* | (2006.01) |

(52) U.S. Cl.
CPC ........... *H04N 5/44591* (2013.01); *G09G 5/00* (2013.01); *H04N 21/40* (2013.01); *H04N 7/08* (2013.01)

(58) Field of Classification Search
CPC ...... H04N 5/44591; H04N 21/40; H04N 7/08; H04N 5/45; H04N 2005/4456; H04N 2005/44556; H04N 2005/44565; G09G 5/00
USPC ........................................................ 348/564
See application file for complete search history.

(56) References Cited

U.S. PATENT DOCUMENTS

| | | | | |
|---|---|---|---|---|
| 6,460,179 | B1 * | 10/2002 | Kretz ................. | H04N 5/44543 348/473 |
| 2002/0034375 | A1 * | 3/2002 | Suda ...................... | H04N 5/445 386/228 |
| 2002/0075403 | A1 * | 6/2002 | Barone, Jr. ........ | H04N 5/44513 348/461 |
| 2005/0204296 | A1 * | 9/2005 | Rossler ............. | G06F 17/30873 715/751 |
| 2006/0256868 | A1 * | 11/2006 | Westerman ............ | H04N 19/70 375/240.24 |
| 2010/0188572 | A1 * | 7/2010 | Card, II .................. | H04N 5/445 348/468 |
| 2015/0365625 | A1 * | 12/2015 | Ishizaki ............. | H04N 21/4312 348/581 |
| 2016/0203108 | A1 * | 7/2016 | Strong ................... | G06F 17/30 715/243 |

* cited by examiner

Primary Examiner — Michael Lee
(74) Attorney, Agent, or Firm — Fenwick & West LLP

(57) ABSTRACT

Embodiments relate to customizing contents displayed at a sink device by converting received contents from a source device. The source device provides, to the sink device, the contents and display information of the source device. The display information of the source device may indicate spatial arrangements (e.g., locations and sizes) of the contents in the source device. The sink device may map sub-display regions of the source device to sub-display regions of the sink device. Moreover, the sink device generates output images for display in sub-display regions of the sink device according to the mapping. By mapping display regions at the sink device, images can be displayed in different arrangements at the sink device without the source device having any information on the configuration of sub-display regions of the sink device.

14 Claims, 6 Drawing Sheets

DISPLAYING MULTIPLE VIDEOS ON SINK DEVICE USING DISPLAY INFORMATION OF SOURCE DEVICE

BACKGROUND

1. Field of the Disclosure

This disclosure pertains to sending data from a source device to a sink device, more specifically to sending information about display regions of the source device to the sink device.

2. Description of the Related Art

A source device for providing multimedia contents may be coupled to a sink device for reproducing the multimedia contents via various connections such as wired cables (e.g., HDMI cable) or wireless networks (e.g., WiFi networks). The multimedia contents may be transmitted to the sink device according to a predetermined protocol defining the content and the structure of data sent over the wired or wireless network. The data transmitted over the wired cables or wireless networks may include more than one stream of data.

SUMMARY

Embodiments relate to generating and transmitting display information and images from a first device to a second device. Display information indicates the configuration of the sub-display regions of the first device. The images are configured for displaying in sub-display regions of a first device with a first configuration. By receiving and using the display information, the second device may display the transmitted images in its sub-display regions of a second configuration different from a first configuration of the sub-display regions of the first device.

In one or more embodiments, the images may be transmitted to the second device through a communication link during first times, and the display information may be transmitted to the second device through the communication link during second times.

In one or more embodiments, relative locations of at least two of the sub-display regions of the first configuration may be different from relative locations of corresponding two of the sub-display regions of the second configuration.

In one or more embodiments, an input command from the second device may be received at the first device in response to receiving user input at an interaction coordinate of the sub-display regions of the second device. The input command may be generated to indicate a coordinate of the sub-display regions of the first device corresponding to the interaction coordinate of the sub-display regions of the second device.

In one or more embodiments, the input command may be generated to indicate a location on the sub-display regions of the first device that corresponds to a location of a touch on one of the sub-display regions of the second device.

In one or more embodiments, the images and the display information may be transmitted using a Mobile High-Definition Link (MHL) protocol or a High-Definition Multimedia Interface (HDMI) protocol.

In one or more embodiments, the display information may include a size and a location of each of the sub-display regions of the first device.

BRIEF DESCRIPTION OF THE DRAWINGS

The teachings of the embodiments disclosed herein can be readily understood by considering the following detailed description in conjunction with the accompanying drawings.

DETAILED DESCRIPTION

Figure 1:
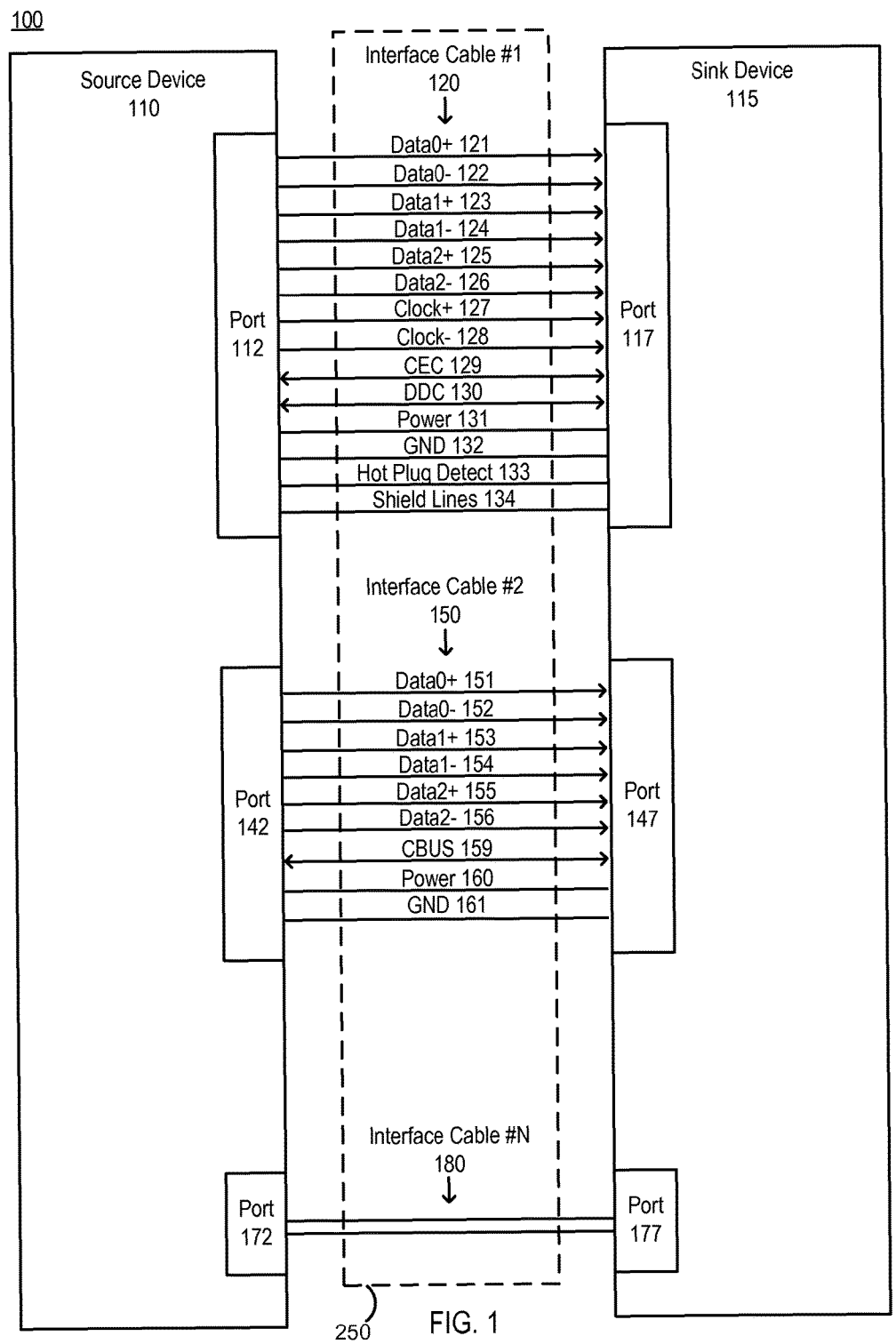
FIG. 1 is a block diagram of a connection between a source device and a sink device for data communications, according to one embodiment.

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality.

Embodiments relate to using display information to determine sub-display regions of a sink device for displaying parts of contents that are configured for display on sub-display regions of a source device. The display information indicates the configuration of sub-display regions of the source device. The sink device maps sub-display regions of the source device to sub-display regions of the sink device. The sink device receives contents from the source device and displays different parts of contents on different sub-display regions of the sink device according to the mapping. Moreover, user input received at a sub-display region of the sink device may be converted according to a coordinate system of the source device based on the mapping before being sent to the source device. Hence, the source device may operate based on the user input received at the sink device without receiving the configuration of sub-display regions of the sink device.

A configuration described herein refers to hardware or software settings of one or more display devices. The configuration may include, for example, spatial arrangements of sub-display regions in one or more display devices, sizes of the sub-display regions, refresh rate of one or more display devices and the color range of the display devices.

The display information described herein refers to information indicating a configuration of the sub-display regions of one or more display devices. For example, the display information of the source device indicates locations and sizes of sub-display regions of the source device for displaying multimedia contents.

The source device described herein refers to a device that sends multimedia contents to another device. The source device may have its own display device for displaying contents or it may rely on the display device of the sink device for reproducing the multimedia contents. The source device may include, but is not limited to, a DVD player, a cell phone, a computer, a tablet, a set top box, a game console, and a digital video recorder.

The sink device described herein refers to a device that receives multimedia contents from the source device. The sink device receives multimedia contents from the source device for reproduction. For example, the sink device may be a cell phone, a laptop, a tablet, a monitor, a projector, a TV, etc.

A relative location described herein refers to a position of a sub-display region with respect to another sub-display region.

Architecture of Example Multimedia Display Environment

FIG. 1 is a block diagram of a multimedia display environment 100, according to one embodiment. The multimedia display environment 100 may include, among other components, a source device 110 and a sink device 115. A communication medium 250 connects the source device 110 and the sink device 115 to transmit multimedia contents such as videos, images, and/or audio to the sink device 115 through the communication medium 250. The source device 110 also provides display information of the source device 110 and other configuration information of the source device 110 to the sink device 115 through the communication medium 250. The sink device 115 generates output images for display using the received multimedia contents and the additional data.

The source device 110 may store contents in memory embedded in the source device 110 or may receive contents from external devices (not shown). In one embodiment, the source device 110 generates multimedia data streams for display on multiple sub-display regions, and transmits the multimedia data streams to the sink device 115.

The source device 110 may include a display device (not shown) and display the contents transmitted to the sink device 115 on the display device. An image corresponding to a display region of the source device 110 may be displayed on the display device. The display region of the source device 110 may be divided into a plurality of sub-display regions according to the display information of the source device 110, and each content may be located on its corresponding sub-display region of the source device 110. Hence, multiple contents may be displayed on the display device of the source device 110.

If the source device 110 includes a display device, the contents in the multimedia data streams sent to the sink device 115 may be arranged and/or scaled for display on the source device's display device. In this case, the spatial arrangement and/or scaling of sub-display regions on the source device 110 may be described in the display information. Alternatively, the source device 110 may not include any display device but instead sends the multimedia data streams to the sink device 115 for display in a predetermined manner on one or more display devices of the sink device 115. In this case, the intended or desirable manner of display of images on the sink device 115 may be described in the display information.

The communication medium 250 may include one or more interface cables 120, 150, 180. Although FIG. 1 describes three separate cables 120, 150, 180, only one or two cables may be used in practice. The source device 110 may transmit multimedia data streams (e.g., audio/video streams) to the sink device 115 and may also exchange control data (herein also referred to as "input command," "control command" or "control signal") with the sink device 115 through the interface cables 120, 150, 180. The source device 110 and the sink device 115 communicate together through in-band communication link or out-of-band communication link. In one embodiment, source device 110 and/or sink device 115 may be repeater devices.

Source device 110 includes physical communication ports 112, 142, 172 for coupling to the interface cables 120, 150, 180. Sink device 115 also includes physical communication ports 117, 147, 177 for coupling to the interface cables 120, 150, 180. Signals exchanged between the source device 110 and the sink device 115 across the interface cables pass through the physical communication ports.

Source device 110 and sink device 115 exchange data using various protocols. In one embodiment, interface cable 150 represents a Mobile High-Definition Link (MHL) cable. The MHL cable 150 supports differential signals transmitted via data0+ line 151, data0− line 152, data1+ line 153, data1− line 154, data2+ line 155 and data2− line 156. In some embodiments of MHL, there may only be a single pair of differential data lines (e.g., 151 and 152). Embedded common mode clocks are transmitted through the differential data lines. The MHL cable 150 may further include a control bus (CBUS) 159, power 160 and ground 161. The CBUS 159 carries control information such as discovery data, configuration data and remote control commands.

In one embodiment, interface cable 120 represents a High Definition Multimedia Interface (HDMI) cable. The HDMI cable 120 supports differential signals transmitted via data0+ line 121, data0− line 122, data1+ line 123, data1− line 124, data2+ line 125, and data2− line 126. The HDMI cable 120 may further include differential clock lines clock+ 127 and clock− 128; Consumer Electronics Control (CEC) control bus 129; Display Data Channel (DDC) bus 130; power 131, ground 132; hot plug detect 133; and four shield lines 134 for the differential signals. In some embodiments, the sink device 115 may utilize the CEC control bus 129 for the transmission of closed loop feedback control data to source device 110.

In one embodiment, interface cable 180 represents a DisplayPort™, digital visual interface (DVI), Universal Serial Bus (USB), Thunderbolt or RS232 cable. At least any one of MHL Cable, HDMI cable, DisplayPort™ cable or DVI cable may be used to transfer multimedia contents. Additional data including display information of the source device 110 and control data from the sink device 115 may be transmitted together with multimedia contents through at least any one of MHL cable, HDMI cable, DisplayPort™ cable or DVI cable as an in-band communication. Alternatively, additional data and control data may be exchanged between the source device 110 and the sink device 115 through a different cable not used for transmitting multimedia contents as out-of-band communication.

The sink device 115 generates an output image for display based on multimedia data streams and display information of the source device 110. The sink device 115 receives the multimedia data streams including multimedia contents from the source device 110 through the communication medium 250. In addition, the sink device 115 receives display information of the source device 110. The sink device 115 generates an output image for display using the display information of the source device 110. To display the output image according to the display information, the sink device 115 may map display regions of the sink device 115 and display regions of the source device 110, and display images for sub-display regions of the source device 110 on corresponding sub-display regions of the sink device 115 according to the mapping.

The mapping between the sub-display regions of the source device 110 and the sink device 115 may be performed at the sink device 115 by extracting region descriptors, as described below in detail with reference to FIG. 5. The number of region descriptors and the sizes of the sub-display regions identified in the region descriptors may then be considered to decide the mapping between the sub-display regions of the source device 110 and the sink device 115. One way is to sequentially map the sub-display regions of the source device 110 to the sink device 115. That is, a sub-display region of the first region descriptor in the display information may be mapped to a first sub-display region of the sink device 115, a sub-display region of the second region descriptor may be mapped to a second sub-display region of the sink device 115, and so forth. Alternatively, the sizes of the sub-display regions may be the primary factor in mapping the sub-display regions. That is, a sub-display region of the source device 110 may be mapped to a sub-display region of the sink device 115 with the closest size to the sub-display region of the source device 110. The display information may also indicate a scheme to map the sub-display regions of the source device 110 to the sub-display regions of the sink device 115.

The sink device 115 may send control data to the source device 110 through the communication medium 250. The control data may include instructions to alter the operations of the source device 110. The control data may include, among other information, a coordinate at the source device 110 corresponding to a coordinate at the sink device 115 associated with user input. The sink device 115 may detect the coordinate associated with the user input using an input device (e.g., a touchscreen) and convert the coordinate at the sink device 115 into a corresponding coordinate at the source device 110 based on mapping information described below in detail below with reference to FIGS. 4A and 4B. The converted coordinate is then sent to the source device 110 through the communication medium 250.

The communication medium 250 may be embodied as a physical cable (e.g., HDMI, MHL, or DisplayPort cable) or a wireless channel using protocols such as Bluetooth®, Zigbee®, near field communication (NFC), or IEEE 802.11 standard.

In one embodiment, the source device 110 transmits display information to the sink device 115 in the same communication link (i.e., the same physical link) as the multimedia contents using time division multiplexing. Such transmission of the display information in the same communication link as the multimedia contents is referred to as "in-band communication." Taking an example of transmitting the display information and the multimedia contents using HDMI or MHL, the video data of the multimedia contents may be transmitted to the sink device 115 through a transition-minimized differential signaling (TMDS) link during video data periods whereas the display information may be transmitted to the sink device 115 during data island periods in vertical blanking periods and/or horizontal blanking periods. Multimedia contents and the display information may also be transmitted to the sink device 115 over the same communication link using a different multiplexing scheme such as a code divisional multiple access method.

In another embodiment, the display information of the source device 110 is transmitted to the sink device 115 through a communication link separate from a communication link used to transmit multimedia contents. Such transmission of the display information in a communication link different from the multimedia contents is referred to as "out-of-band communication." Taking an example of MHL, the multimedia contents are transmitted to the sink device 115 over a TMDS link whereas the display information is transmitted to the sink device 115 over CBUS or an enhanced version thereof. The display information is sent over a channel link different from the multimedia contents, and hence, the display information is sent via "out-of-band communication."

Architecture of Example Source Device

Figure 2:
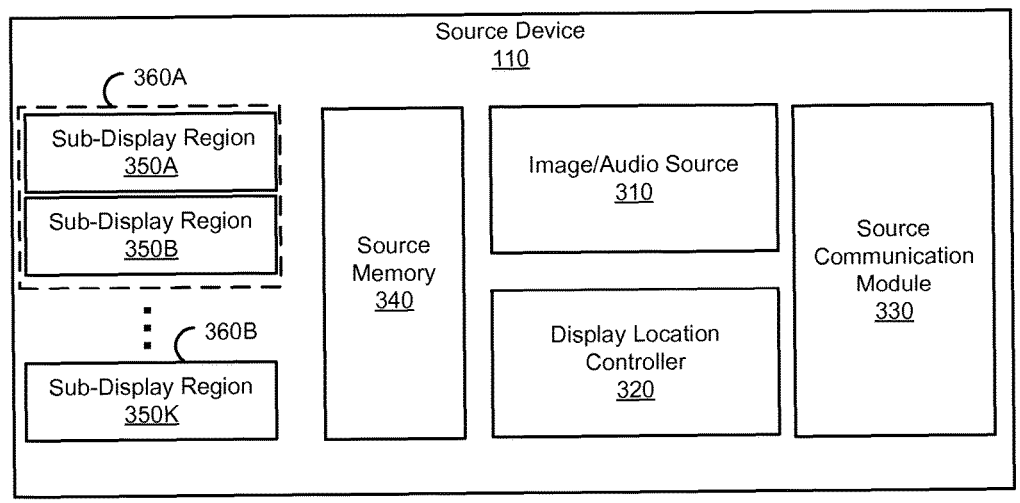
FIG. 2 is a block diagram of a source device, according to one embodiment.

FIG. 2 is a block diagram of the source device 110 of FIG. 1, according to one embodiment. The source device 110 may include, among other components, a source communication module 330, an image/audio source 310, a display location controller 320, source memory 340, and display devices 360A, 360B. Each of these components may be embodied as hardware, software, firmware or a combination thereof. In other embodiments, the source device 110 may include separate image and audio sources.

The image/audio source 310 receives multimedia contents and provides image data streams to the source communication module 330. The image/audio source 310 may receive contents from the source memory 340 or receive them from external devices. In one embodiment, the image/audio source 310 combines multiple images and generates an image stream representing a collage of images for displaying on the source device 110 and/or sending to the sink device 115.

The source device 110 may include display devices 360A, 360B. As shown in display device 360A, an entire display region may be divided into multiple sub-display regions 350A, 350B. An entire display region of a display device may also constitute a sub-display region, as shown in display device 360B. Further, a sub-display region may also be embodied across two or more display devices. In one example, a collage of contents fits into the display region of the source device 110, and contents are located in their corresponding sub-display regions 350.

The display location controller 320 generates display information of the source device 110. The display information includes information from which sizes and locations of sub-display regions 350A through 350K of the source device 110 can be derived. The display information may include starting and ending coordinates of each sub-display regions 350, as described below in detail with reference to FIG. 5.

The display location controller 320 receives control data from the sink device 115 via source communication module 330 and performs operations based on user input as indicated in the control data. The control data may include coordinates associated with user input from the sink device 115 according to the coordinate system of the display regions of the source device 110, as described below in detail with reference to FIG. 3.

The source memory 340 is a repository for storing information used to generate multimedia data streams. The source memory 340 may store multimedia contents. The multimedia contents may include image contents, audio contents or both. Additionally, the source memory 340 may store additional data including display information of the source device 110. The display information may also indicate one or more of aspect ratio, resolution and chromaticity for displaying images. The source memory 340 may store multimedia data streams including combined contents prior to, during or after transmission to the sink device 115.

Architecture of Example Sink Device

Figure 3:
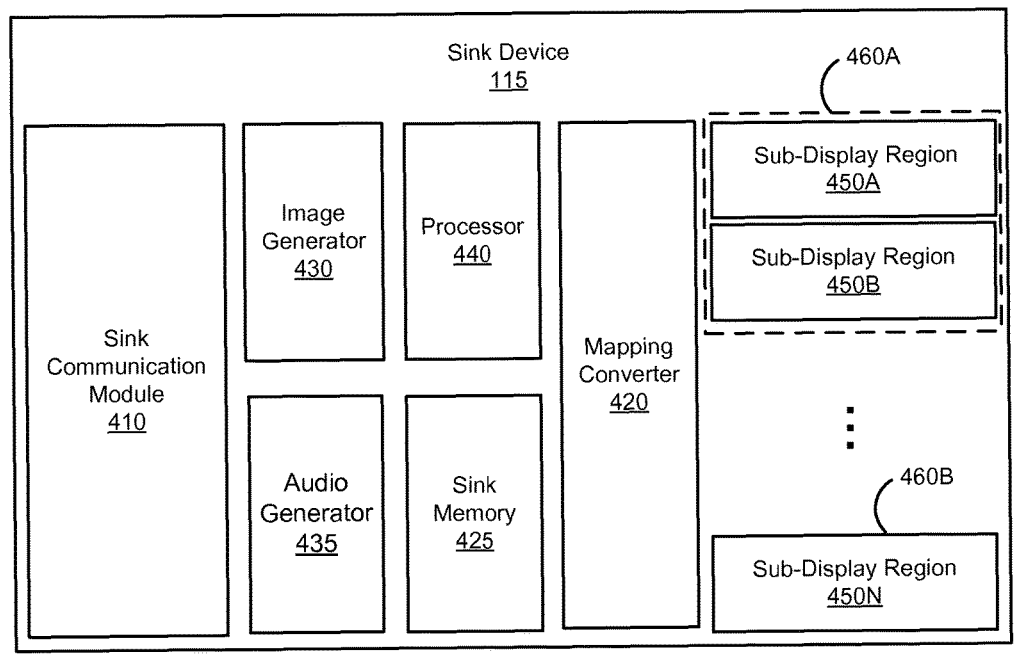
FIG. 3 is a block diagram of a sink device, according to one embodiment.

FIG. 3 is a block diagram of the sink device 115 of FIG. 1, according to one embodiment. The sink device 115 may include, among other components, a sink communication module 410, a mapping converter 420, an image generator 430, an audio generator 435, a sink memory 425, a processor 440 and display devices 460A, 460B. Each of these components may be embodied as hardware, software, firmware or a combination thereof. Together, these components generate output image and/or audio according to the contents transmitted from the source device 110.

The sink device 115 receives contents in the multimedia data streams from the source device 110 and displays contents on its display devices 460A, 460B. Specifically, the sink device 115 displays portions of the contents on different sub-display regions of the display device 460.

The sink communication module 410 establishes communication with the source device 110 through the communication medium 250. The sink communication module 410 receives the multimedia data streams and display information of the source device 110 through the communication medium 250. The sink communication module 410 decodes and processes the multimedia data streams into image data streams and audio data streams for reproduction. Further, the sink communication module 410 may transmit, through the communication medium 250, control data indicating coordinates at the source device 110 that correspond to coordinates at the sink device 115 associated with user input.

The mapping converter 420 receives the display information of the source device 110 from the sink communication module 410 and performs mapping of parts of contents received from the source device 110 to sub-display regions 450A through 450N (generally herein referred to as "sub-display region 450") of the sink device 115. As in the source device 110, (i) a sub-display region of the sink device 115 may be displayed on a part of the display device 460 (in the example of FIG. 3, the sub-display regions 450A and 450B are associated with a single display device 460A), (ii) a sub-display region of the sink device 115 may take up an entire display region of the display device 460 or (iii) a single sub-display region may span across multiple display devices 460 in the sink device 115. Each of the sub-display regions 450 of the sink device 115 may correspond to one of the sub-display regions 350 of the source device 110. The mapping converter 420 may generate mapping information that indicates correspondence of the sub-display regions 350 of the source device 110 to the sub-display regions 450 of the sink device 115.

The mapping converter 420 may also use the mapping information to convert a coordinate associated with user input received at the sink device 115 to a corresponding coordinate in a coordinate system of the source device 110. For example, when the sink device 115 receives user input through a touch screen display device 460 as identified by a coordinate in the touch screen display device 460, the mapping converter 420 converts the coordinate into a corresponding coordinate in a sub-display region of the source device 110 corresponding to the touch screen display device 460 of the sink device 115. The mapping converter 420 may provide the converted coordinates to the sink communication module 410 for transmission to the source device 110 as control data.

The image generator 430 generates images for displaying on the display devices 460 by processing the contents received from the sink communication module 410. The image generator 430 receives the image data streams from the sink communication module 410. The image generator 430 generates output images according to the mapping information. The image generator 430 may generate and send multiple output images, where each output image is presented on a single sub-display region 450. The image generator 430 may also transcode images for display in the sub-display regions 450 of the sink device 115. For example, the image generator 430 scales the contents, adjusts color range or a refresh rate of the images according to the configuration of the display devices 460 of the sink device 115.

The audio generator 435 processes audio data for playing on the display devices 460 or other audio devices (not shown). The audio generator 435 receives audio data streams from the sink communication module 410. Each audio data stream may be associated with a corresponding sub-display region 450. The audio generator 435 may generate an audio signal based on an audio data stream corresponding to a selected sub-display region 450, and provide the audio signal to one or more display devices 460. In one embodiment, a selection of a sub-display region 450 for generating the audio signal can be received from any display devices 460. In another embodiment, a selection of a sub-display region 450 for generating the audio signal can be received from a display device 460 in control.

The control command (or control signal) is transmitted to the source device 110 to cause an operation on the source device 110. For example, the control command may cause the source device 110 to turn on/off power, stop data transmission, start data transmission, change the transmission or video play speed, instantiate a program or an application, or terminate the program. The control command may indicate a coordinate on a sub-display region 450 of the sink device 115. The coordinate of the control command at the sink device 115 (or display device 460) is converted at the mapping converter 420 to correspond to a coordinate of a sub-display region 350 of the source device 110. The control command with the converted coordinate may be sent to the source device 110. The conversion occurs without the source device 110 having information about the coordinate system or details of sub-display regions 450 available on the sink device 115.

The processor 440 executes instructions to operate one or more of the sink communication module 410, image generator 430, audio generator 435, mapping converter 420 and display devices 460. The processor 440 may receive instructions from the sink memory 425.

The sink memory 425 is a repository for storing instructions to operate the sink device 115. The sink memory 425 may include one or more non-transitory computer readable storage media (e.g., hard disk drive, solid state memory, and etc.) and store software such as an operating system and other applications. Additionally, the sink memory 425 may store mapping information to be used for generating images to be displayed on the sub-display regions 450 of the sink device 115. Moreover, the sink memory 425 may store configuration of the sink device 115.

Example Mapping of Sub-Display Regions

Figure 4A:
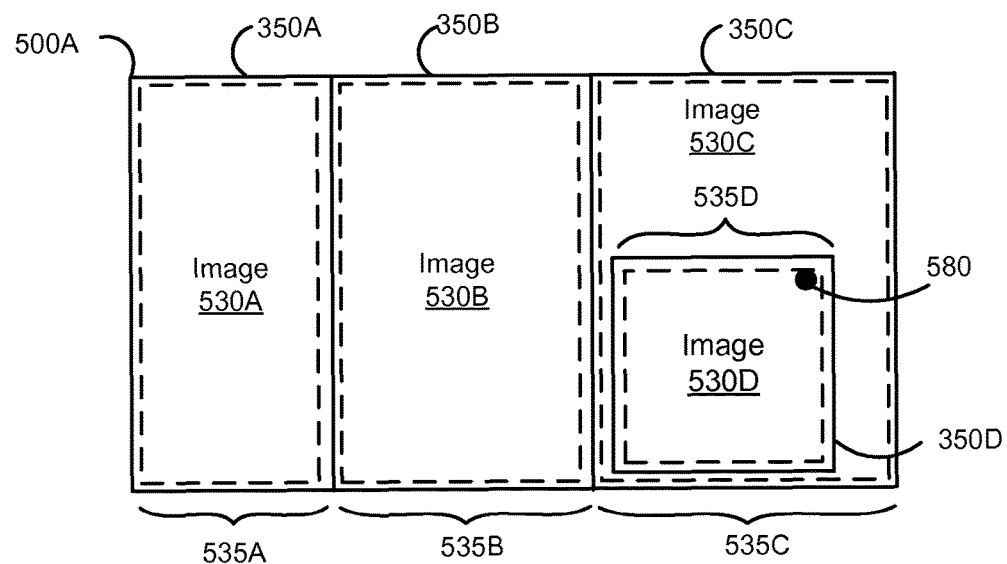
FIG. 4A is an example display region of the source device, according to one embodiment.

FIG. 4A is an example display region 500A of the source device 110 of FIG. 1, according to one embodiment. The display region 500A includes sub-display regions 350A, 350B, 350C, and 350D in a display device 360 which displays corresponding images 530A, 530B, 530C, and 530D. In the example of FIG. 4A, sub-display regions 350A, 350B, 350C, and 350D have widths 535A, 535B, 535C, and 535D, respectively. The sub-display region 350B is located between the sub-display region 350A and the sub-display region 350C. The source device 110 generates multimedia data streams according to display information of the source device 110 indicating configuration or spatial arrangements of sub-display regions 350 of the source device 110.

Figure 4B:
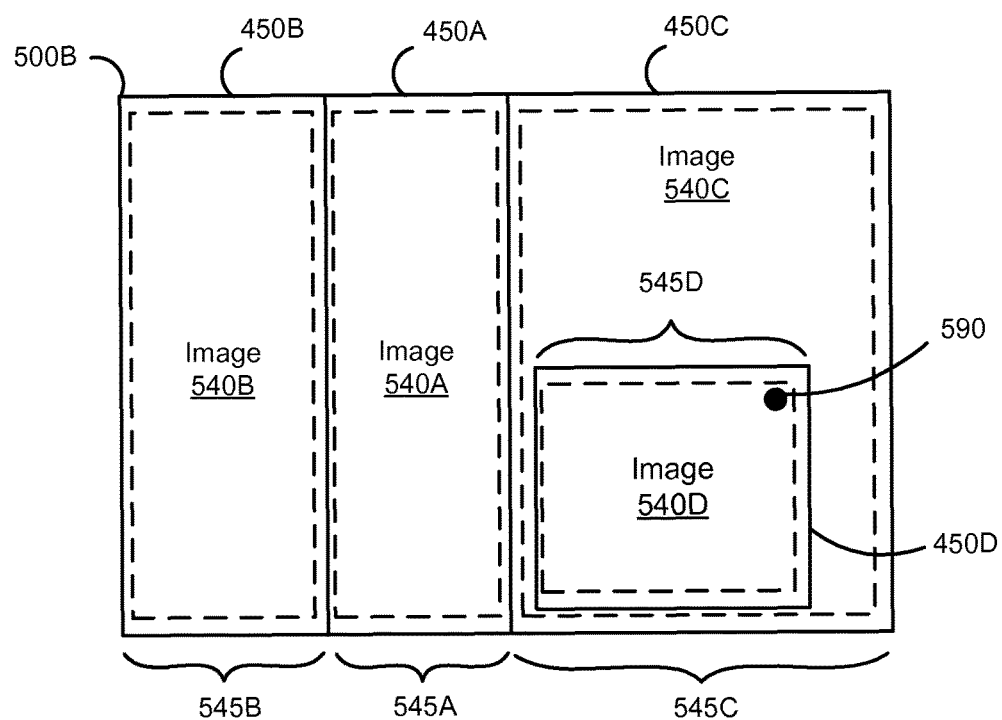
FIG. 4B is an example display region of the sink device, according to one embodiment.

FIG. 4B is an example display region 500B of the sink device 115 of FIG. 1, according to one embodiment. The display region 500B includes sub-display regions 450A, 450B, 450C, and 450D in a display device 460, each displaying corresponding images 540A, 540B, 540C, and 540D. The images 540A, 540B, 540C, and 540D displayed on the display device 460 correspond to images 530A, 530B, 530C, and 530D transmitted from the source device 110, respectively. The sink device 115 may scale or locate images 540A, 540B, 540C, and 540D according to the mapping information.

The relative sizes of sub-display regions 450 of the sink device 115 may be different from relative sizes of sub-display regions 350 of the source device 110. For example, sub-display regions 450A, 450B, 450C, and 450D of the sink device 115 have widths 545A, 545B, 545C, and 545D, respectively. The ratios of widths 535A, 535B, 535C, and 535D of sub-display regions 350 of the source device 110 may be different from ratios of widths 545A, 545B, 545C, and 545D of sub-display regions 450 of the sink device 115.

In addition or in lieu of the difference in relative sizes, relative locations of sub-display regions 450 of the sink device 115 may be different from relative locations of sub-display regions 350 of the source device 110. For example, the sub-display region 450A of the sink device 115 is arranged between the sub-display region 450B and the sub-display region 450C instead of the sub-display region 450B located between the sub-display regions 450A and 450C. In another example, the sink device 115 has a different number of sub-display regions than the source device 110.

In one embodiment, the source device 110 is a handheld mobile device and a sink device 115 is a telematics or entertainment system in an automobile with one or more display devices 460. The sink device 115 may be built into a dashboard (e.g., near an audio controller) with a port for connecting to the sink device 115 through a cable. The sink device 115 may be connected to the source device 110 through wireless communication link. One display device 460 may be built into the dashboard, and another display device 460 may be implemented on a back of a head rest for rear passengers or anywhere else in the automobile. Different display devices 460 may display different images or different arrangements of images.

In one example, a user may touch a touch screen in a display device 460 at a coordinate 590 that may be on an image 540D displaying "STOP VIDEO." Responsive to sensing a touch, the sink device 115 may generate control data to stop transmission of multimedia data streams and transmit the control data to the source device 110. The sink device 115 may convert the coordinate 590 of the sub-display region 450D at the display device 460 into a coordinate 580 of the sub-display region 350D at the source device 110, and may transmit the converted coordinate 580 to the source device 110. The coordinate 580 is on the image 530D allocated to display "STOP VIDEO" at the source device 110. After receiving the coordinate 580, the source device 110 may stop playing the video, as if a user touched the coordinate 580 of a touch screen 360 of the source device 110.

Although above examples relate to an automobile, other embodiments may be used in other systems displaying contents on one or more display devices. For example, the multimedia display environment 100 may be embodied on other public transportation (e.g., airplane, bus, subway, etc.), where one or more media players provide multiple contents and multiple display screens display contents to different users. In another example, a handheld mobile device transmitting images may be connected to another handheld mobile device.

Example Display Information

Figure 5:
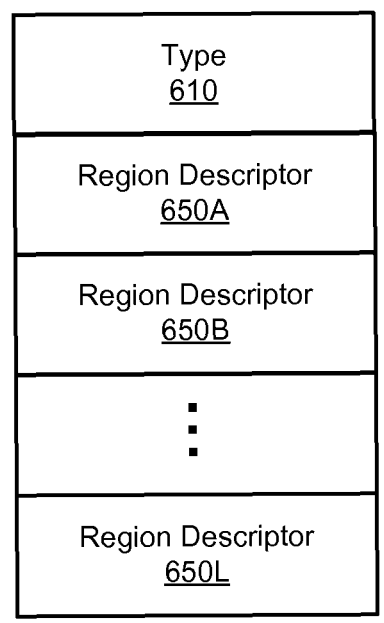
FIG. 5 illustrates example display information transmitted from the source device to the sink device, according to one embodiment.

FIG. 5 is a diagram illustrating data fields in display information 600 transmitted from the source device 110 to the sink device 115, according to one embodiment. In one embodiment, the display information 600 may be transmitted by in-band communication during allocated time slots over the same communication link as multimedia data streams. For example, the additional data may be transmitted during time slots (e.g., vertical blanking period or horizontal blanking period) as data island packets whereas multimedia contents are transmitted during different time slots. Alternatively, the additional data may be transmitted to the sink device 115 through out-of-band communication link.

In one embodiment, the data information includes a type field 610 indicating that the following information are region descriptors 650A through 650L (herein generally referred to as a "region descriptor 650") for describing configuration of sub-display regions 350 on the source device 110.

In one embodiment, the region descriptor 650 indicates a starting coordinate and an ending coordinate of a corresponding sub-display region 350 of the source device 110. In another embodiment, the region descriptor 650 indicates the size and the location of a corresponding sub-display region 350 on the source device 110. The size of the sub-display region 350 can be represented by the height and width of the sub-display region.

The use of display information accompanies advantages including, but not limited to, (i) enabling a source device to display information on a sink device in a manner that is agnostic to the sink device, and (ii) enabling the source device to perform operations based on user input received at the sink device without performing further processes associated with coordinates of the user input at the sink device.

Process for Displaying Contents and Receiving User Input

Figure 6:
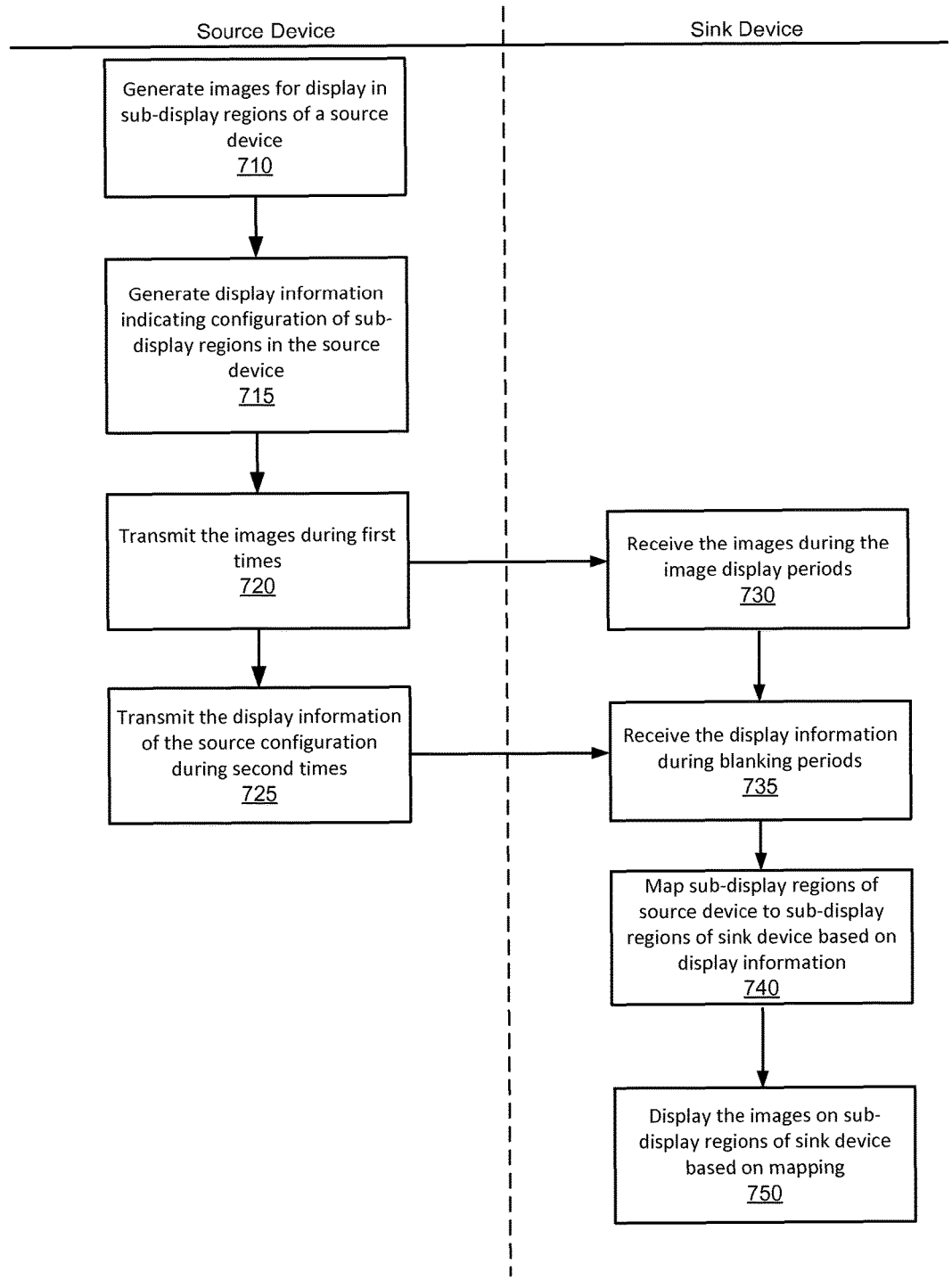
FIG. 6 is an interaction diagram illustrating a process of displaying contents at the sink device by sending information from the source device to the sink device, according to one embodiment.

FIG. 6 is an interaction diagram illustrating a process of displaying contents at the sink device by sending information from a source device to a sink device, according to one embodiment. The source device 110 generates 710 images for display in sub-display regions 350 of the source device 110. The source device 110 also generates 715 display information indicating configuration of sub-display regions 350 in the source device 110.

The source device 110 transmits 720 the images during first times to the sink device 115. The sink device 115 receives 730 the images during the first times (e.g., video data periods of HDMI or MHL standard) from the source device 110. The source device 110 transmits 725 the display information in the source configuration during second times (e.g., data island periods of HDMI or MHL standard) to the sink device 115. The sink device 115 receives 735 the display information in the source configuration during second times from the source device 110.

The sink device 115 maps 740 sub-display regions of the source device to sub-display regions of sink device based on display information. Based on the mapping, the sink device 115 displays 750 the images.

The steps and sequences as illustrated in FIG. 6 are merely illustrative. For example, the images can be generated 710 after the display information is generated 715. Further, the images can be sent after the display information. Moreover, part of the display information may be sent to the sink device before the images are transmitted and the remaining display information may be sent after the images are transmitted.

Figure 7:
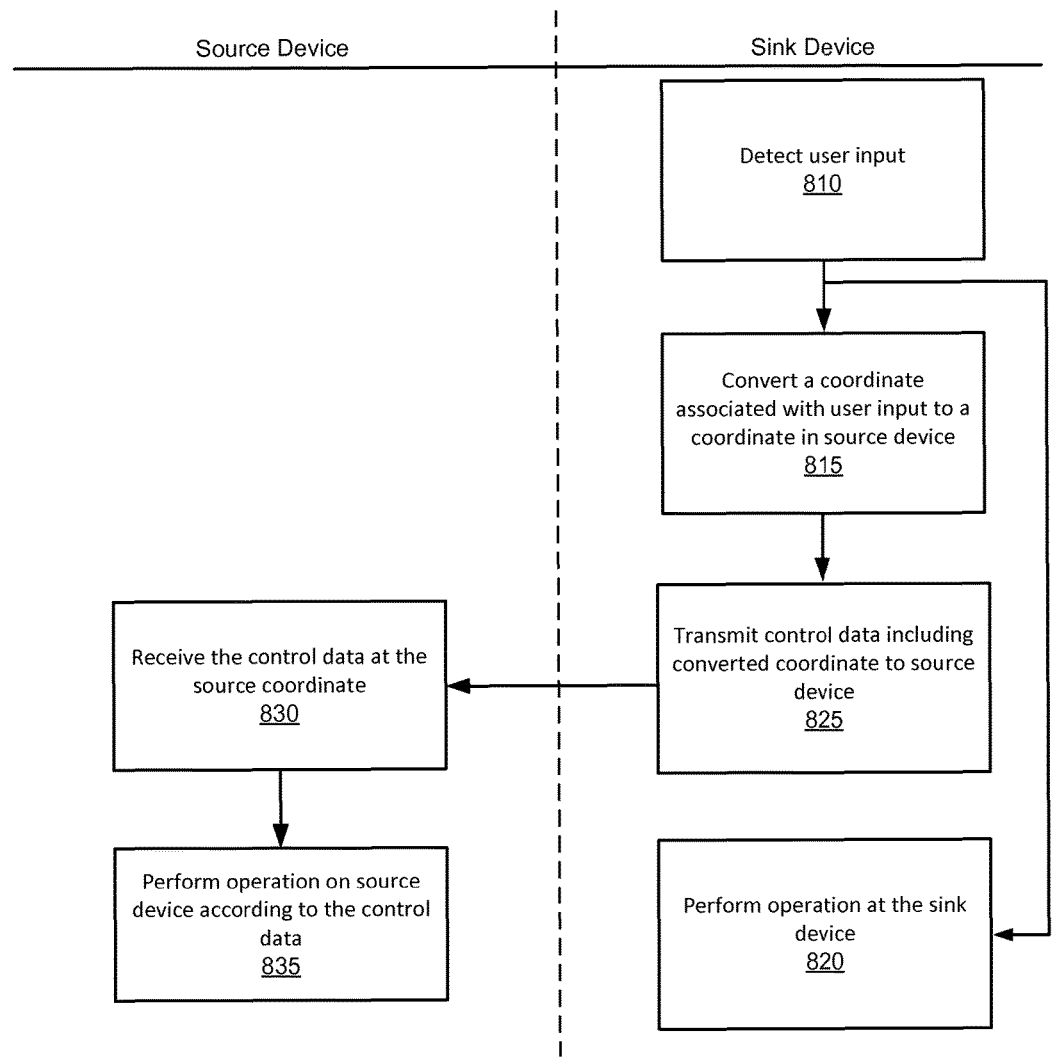
FIG. 7 is an interaction diagram illustrating a process of receiving user input at the source device via the sink device, according to one embodiment.

FIG. 7 is an interaction diagram illustrating a process of receiving user input at the source device 110 via a sink device 115, according to one embodiment. The sink device 115 detects 810 user input. The user input is associated with a coordinate according to a coordinate system used in the sink device 115. The sink device 115 converts 815 the coordinate associated with the user input into a coordinate according to a coordinate system used by a source device 110. The sink device 115 generates and transmits 825 control data including the converted coordinate to the source device 110.

In another embodiment, the sink device 115 performs 820 operations at the sink device 115. The sink device 115 may perform operations without converting the coordinate and transmitting the control data including the converted coordinate to the source device 110. For example, the sink device 115 identifies a selection of a sub-display region corresponding to a coordinate of a user input and generates an audio signal based on an audio stream associated with the selected sub-display region.

The source device 110 receives 830 the control data from the sink device 115. The source device 110 then performs 835 an operation on the source device 110 according to the control data.

While particular embodiments and applications of the present disclosure have been illustrated and described, it is to be understood that the embodiments are not limited to the precise construction and components disclosed herein.

What is claimed is:

1. A method of transmitting video data, the method comprising:
    generating images for display in sub-display regions of a first device;
    generating, at the first device, display information indicating coordinates corresponding to locations of the sub-display regions of the first device;
    transmitting the images from the first device to a second device through a communication link; and
    transmitting the display information indicating the coordinates corresponding to locations of the sub-display regions of the first device to the second device through the communication link to cause the second device to display the transmitted images in sub-display regions of the second device based upon the received display information, relative locations of at least two of the sub-display regions of the first device being different from relative locations of corresponding two of the sub-display regions of the second device, at least one of the sub-display regions displayed in a first display device of the second device and another of the sub-display regions displayed in a second display device of the second device physically separate from the first display device; and
    receiving, at the first device, an input command from the second device in response to receiving user input at an interaction coordinate of the sub-display regions of the second device, the input command from the second device indicating a coordinate of the sub-display regions of the first device mapped by the second device from the interaction coordinate of the sub-display regions of the second device.

2. The method of claim 1, wherein the images are transmitted to the second device through the communication link during first times, and the display information indicating at least the locations of the sub-display regions of the first device is transmitted to the second device through the communication link during second times.

3. The method of claim 1, wherein the input command is generated to indicate a location on the sub-display regions of the first device that corresponds to a location of a touch on one of the sub-display regions of the second device.

4. The method of claim 1, wherein the images and the display information are transmitted using a Mobile High-Definition Link (MHL) protocol or a High-Definition Multimedia Interface (HDMI) protocol.

5. The method of claim 1, wherein the display information further indicates a size of each of the sub-display regions of the first device.

6. A method of displaying video data, the method comprising:
    receiving images in sub-display regions of a first device through a communication link;
    receiving display information indicating coordinates corresponding to locations of the sub-display regions of the first device for display at the first device through the communication link;
    mapping, at a second device, the sub-display regions of the first device to sub-display regions of the second device based upon the received coordinates, relative locations of at least two of the sub-display regions of the first device being different from relative locations of corresponding two of the sub-display regions of the second device, at least one of the sub-display regions displayed in a first display device of the second device and another of the sub-display regions displayed in a second display device of the second device physically separate from the first display device; and
    displaying, at the second device, the images in the sub-display regions of the second device based on the mapping;
    receiving user input at a first coordinate of one of the sub-display regions of the second device;
    converting the first coordinate to a second coordinate of one of the sub-display regions of the first device based on the mapping; and
    transmitting the second coordinate from the second device to the first device.

7. The method of claim 6, wherein the images are received at the second device through the communication link during first times, and the display information indicating at least the locations of the sub-display regions of the first device is received at the second device through the communication link during second times.

8. The method of claim 6, wherein the user input corresponds to a touch signal indicating a location of a touch on the one of the sub-display regions of the second device.

9. The method of claim 6, wherein the display information further indicates a size of each of the sub-display regions of the first device.

10. The method of claim 6, wherein the images and the display information are received using a Mobile High-Definition Link (MHL) protocol or a High-Definition Multimedia Interface (HDMI) protocol.

11. The method of claim 6, further comprising transcoding the received images at the second device for display in the sub-display regions of the second device.

12. The method of claim 6, further comprising:
    receiving, at the second device, audio streams;
    receiving a selection of a sub-display region of the sub-display regions of the second device; and generating, at the second device, an audio signal based on an audio stream of the audio streams, the audio stream associated with the selected sub-display region of the second device.

13. A device for displaying video data, the device comprising:
- a communication module configured to receive, through a communication link, images in sub-display regions of another device for display at the other device and display information indicating coordinates corresponding to locations of the sub-display regions of the other device for display at the other device; and
- a mapping converter configured to map, for displaying the images at the device, the sub-display regions of the other device to sub-display regions of the device based upon the received coordinates, relative locations of at least two of the sub-display regions of the other device being different from relative locations of corresponding two of the sub-display regions of the device, at least one of the sub-display regions of the device displayed in a first display device and another of the sub-display regions of the device displayed in a second display device physically separate from the first display device, and
- wherein the mapping converter is further configured to convert a first coordinate representing a user input at one of the sub-display regions of the device to a second coordinate of one of the sub-display regions of the other device based on the mapping for transmitting to the other device.

14. The device of claim 13, wherein the communication module receives the images through the communication link during first times, and the display information indicating at least the locations of the sub-display regions of the other device during second times.

* * * * *